(12) United States Patent
Meyersweissflog

(10) Patent No.: US 8,022,693 B2
(45) Date of Patent: Sep. 20, 2011

(54) MAGNETIC FIELD SENSITIVE SENSOR

(75) Inventor: Stefan Meyersweissflog, Rudelzhausen (DE)

(73) Assignee: Woelke Magnetbandtechnik GmbH & Co. KG, Schweitenkirchen (DE)

( * ) Notice: Subject to any disclaimer, the term of this patent is extended or adjusted under 35 U.S.C. 154(b) by 428 days.

(21) Appl. No.: 12/249,204

(22) Filed: Oct. 10, 2008

(65) Prior Publication Data

US 2009/0161264 A1 Jun. 25, 2009

(30) Foreign Application Priority Data

Oct. 12, 2007 (DE) ..................... 20 2007 014 319 U

(51) Int. Cl.
*G01R 33/06* (2006.01)
(52) U.S. Cl. .................................................. 324/207.21
(58) Field of Classification Search ........................ None
See application file for complete search history.

(56) References Cited

U.S. PATENT DOCUMENTS

| | | | |
|---|---|---|---|
| 4,473,767 A | | 9/1984 | Minagawa et al. |
| 4,612,502 A | * | 9/1986 | Spies ....................... 324/207.22 |
| 4,725,776 A | * | 2/1988 | Onodera et al. ......... 324/207.21 |
| 4,999,579 A | | 3/1991 | Rüb Winfried |
| 5,021,736 A | * | 6/1991 | Gonsalves et al. ............ 324/202 |
| 5,500,589 A | * | 3/1996 | Sumcad ........................ 324/202 |
| 5,955,882 A | * | 9/1999 | Eisschiel et al. ......... 324/207.21 |
| 6,246,234 B1 | * | 6/2001 | Yokotani et al. ......... 324/207.21 |
| 6,329,818 B1 | * | 12/2001 | Tokunaga et al. ............. 324/252 |
| 6,577,124 B2 | * | 6/2003 | Coehoorn et al. ............. 324/252 |
| 6,882,149 B2 | * | 4/2005 | Nitz ............................. 324/309 |
| 7,423,420 B2 | | 9/2008 | Meyersweissflog |
| 2011/0074405 A1 | * | 3/2011 | Doogue et al. ................ 324/251 |
| 2011/0101975 A1 | * | 5/2011 | Popovic et al. ............... 324/251 |

FOREIGN PATENT DOCUMENTS

| | | |
|---|---|---|
| DE | 39 26 328 | 2/1991 |
| DE | 296 14 974 | 1/1997 |
| DE | 198 20 167 | 11/1998 |
| DE | 101 23 539 | 11/2002 |
| DE | 202 18 754 | 3/2003 |
| DE | 102 14 685 | 5/2003 |
| DE | 20 2007 000 245 | 7/2007 |
| DE | 10 2006 005 746 | 8/2007 |

* cited by examiner

*Primary Examiner* — Jermele M Hollington
(74) *Attorney, Agent, or Firm* — Alleman Hall McCoy Russell & Tuttle LLP

(57) ABSTRACT

A sensor, preferably for magnetic rotary or linear sensor systems which include a scale arranged at a given distance from the sensor. The sensor has at least one magnetic field-sensitive GMR sensor element, which is arranged in a housing. The housing additionally includes at least one magnetic field source each associated to the at least one GMR sensor element. The at least one GMR sensor element is firmly cast into an associated slot in the housing. On at least one side of the slot, a projection protrudes into the interior of the housing, flush with a side wall of the slot, which also includes mounting recesses for accommodating the magnetic field source.

17 Claims, 6 Drawing Sheets

MAGNETIC FIELD SENSITIVE SENSOR

CROSS-REFERENCE TO RELATED APPLICATIONS

This application claims priority to German Utility Model Application No. 20 2007 014 319.2, filed Oct. 12, 2007, which is hereby incorporated by reference in its entirety for all purposes.

TECHNICAL FIELD

This invention relates to a sensor, comprising at least one magnetic field-sensitive GMR sensor element.

For magnetic rotary or linear sensor systems, in which the scale is composed of soft magnetic material (e.g. a gear rack, gear wheel, or grooved tape made of soft magnetic steel) or of permanent magnets suitably arranged with respect to each other (e.g. small permanent magnets on a strip or differently magnetized regions in a semimagnetic tape), sensors provided with a constant magnetic source (e.g. permanent magnet) beside the actual magnetic field-sensitive sensor element are used as a scanner unit. In the past, magnetic field-sensitive resistors (magnetoresistor, magnetoresistive element) have been used as magnetic field-sensitive sensor elements.

BACKGROUND

Such magnetic field-sensitive sensors are known already. Such sensors for measuring lengths and angles are described in DE 32 40 794 C2 and in DE 39 26 328 A1. It is known from DE 38 29 390 A1 to use these magnetic field-sensitive sensors for measuring rotational speed.

As is known for instance from DE 296 14 974 U1, two sinusoidal signal tracks phase-shifted by 90° and a reference signal track exhibiting a single pulse are required for a sensor system.

So-called GMR sensors (i.e. Giant Magnetoresistive Sensors) have been used for quite some time as sensor elements. This technology is useful for highly integrative measurements of speed and position of objects. The high sensitivity of the sensor allows comparatively large distances between the measurement object and the sensor element.

The sensor composed of two Wheatstone bridges responds to field gradients in the sensor surface. The two bridges are adapted to the tooth structure such that two sinusoidal periods shifted by 90° are issued as output signals.

For scanning ferromagnetic tooth structures, the sensor requires a supporting magnet. In the most simple case, the supporting magnet is attached to the back of the sensor element. For difference measurement, the geometry of the individual bridge resistors is designed for one tooth spacing each. The tooth structure modulates the magnetic field of the supporting magnets by densifying or extending the magnetic field lines. This modulated field strength is converted by the sensor into a proportional electrical signal. The maximum output voltage of the sensor depends on the magnetic field strength of the permanent magnet, the distance between the sensor element and the measurement object, and the structure of the measurement object.

In DE 20 2005 011 361.1, a sensor has already been described, in which two GMR sensor elements were used. For optimizing the zero signal course, either the magnetic field source, the GMR sensor elements and/or the housing were tilted by a predetermined angle with respect to the reference plane of the scale at a given distance. Practice has shown that the adjustment of the respective tilt angle during production of the sensor is quite expensive.

SUMMARY

Therefore, it is the object of the invention to develop the generic sensor in such a way that on the one hand it can easily be mounted, where it is ensured that the geometric arrangement of the sensor elements in the housing and the geometric association of the magnet to the sensor elements can exactly be specified.

In accordance with the invention, this object is solved by a sensor comprising at least one magnetic field-sensitive GMR sensor element which is arranged in a housing, wherein the housing additionally includes one magnetic field source each associated to the at least one GMR sensor element, wherein the at least one GMR sensor element is firmly cast into an associated slot in the housing, wherein on at least one side of the slot a projection protrudes into an interior of the housing flush with a side wall of the slot, the projection including mounting recesses for accommodating the magnetic field source. The sensor can be used for magnetic rotary or linear sensor systems.

A sensor with at least one magnetic field-sensitive GMR sensor element, which is arranged in a housing, wherein the housing additionally includes one magnetic field source each associated to the at least one GMR sensor element, is formed in such a way that the at least one GMR sensor element is firmly cast into an associated slot in the housing, wherein on at least one point of the slot a projection protrudes into the interior of the housing flush with this side wall of the slot, which also includes mounting recesses for accommodating the magnetic field source. The inventive solution provides for positioning the sensor elements in the slot more exactly, as the magnetic field source can support not only on the comparatively low side wall of the slot, but during positioning also flush on the surface of the projection adjoining the side wall of the slot. The mounting recess for accommodating the magnetic field source on the projection in turn leads to the fact that the magnetic field source can exactly be positioned relative to the sensor elements and the housing.

Additional aspects of the invention follow below.

Accordingly, a GMR sensor element can be associated to a reference signal track provided in the scale for generating a referred signal.

Advantageously, two basic sensor elements can be contained in a GMR sensor element, which together are arranged in a slot. These two basic sensor elements are associated to the incremental signal track such that they generate two phase-shifted signals.

The magnetic field source can comprise at least one permanent magnet.

Advantageously, the respectively used permanent magnet is cuboidal, wherein its dimensions relative to the associated GMR sensor element are chosen such that a largely homogeneous magnetic field acts on the GMR sensor element.

Advantageously, the housing is made of aluminum.

In the at least one slot, an encapsulated or also a non-encapsulated sensor element can be inserted.

Advantageously, the slot is longer than the length of the sensor element. Thus, the signal can be optimized by positioning the sensor element in the slot.

Advantageously, the housing has a substantially two-part design.

Particularly advantageously, the circuit board has an L-shaped design. In this way, the outside dimension of the housing can be minimized.

Particularly advantageously, two GMR sensors and a magnetic field source associated to the same can be inserted in the housing in a fixed association relative to each other.

Advantageously, the supply cable of the sensor is screwed into a thread of the housing for strain relief via its outside insulation.

Further features, details and advantages of the invention can be taken from the embodiments illustrated in the drawing, in which:

DETAILED DESCRIPTION

Figure 1:
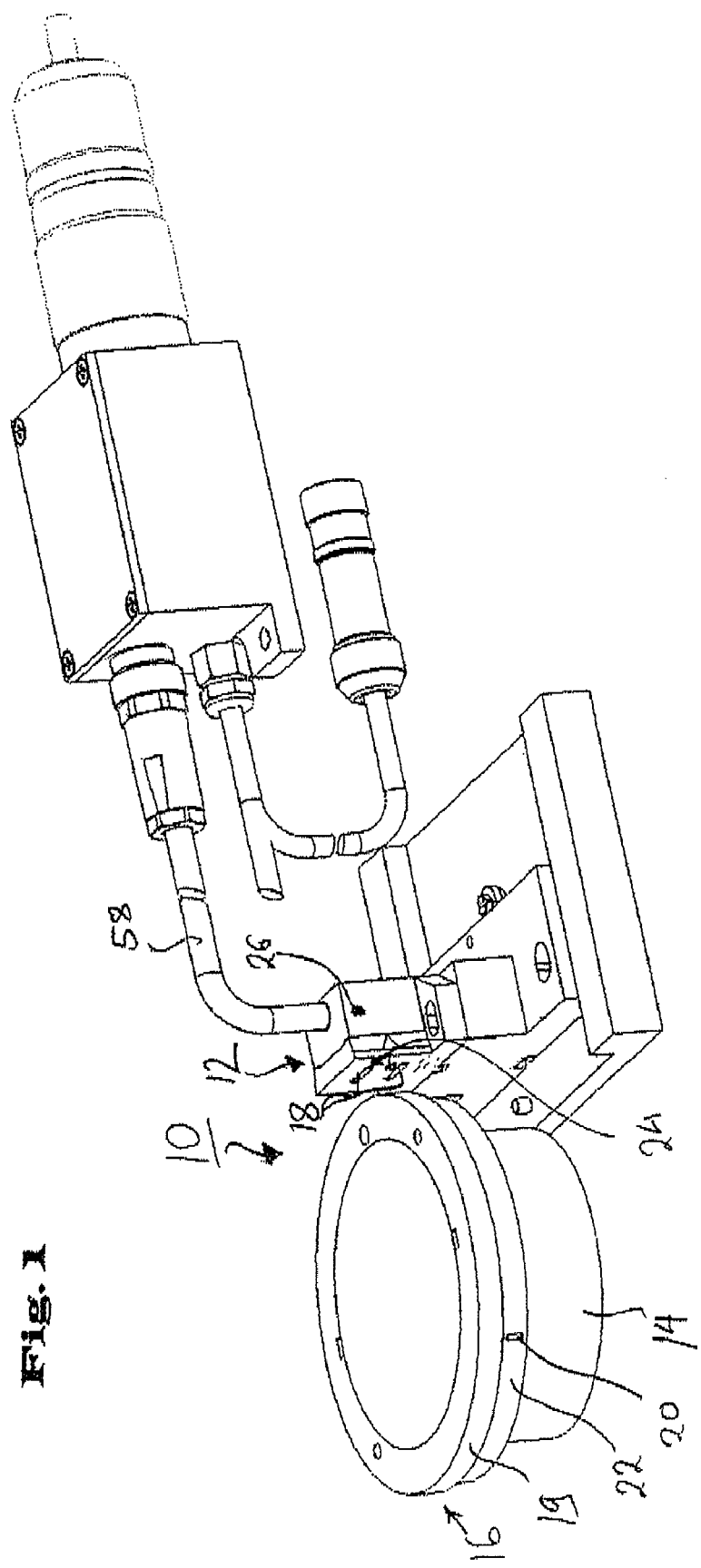
FIG. 1 shows a perspective view of a sensor system in schematic form, in which the sensor of the invention can be used.
Figure 2:
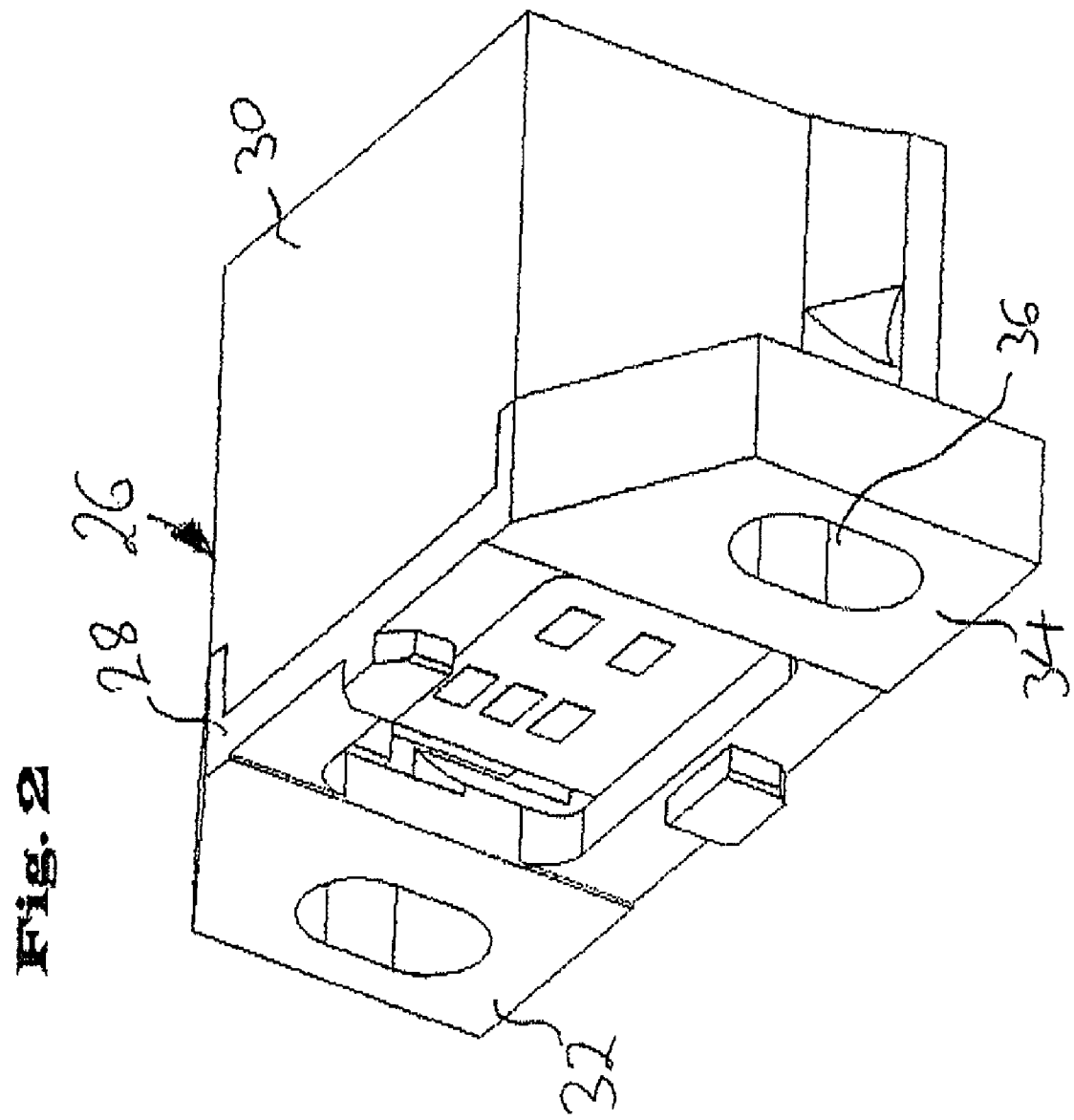
FIGS. 2 to 6 show perspective views of the sensor of the invention in various mounting conditions.

In FIG. 1, a rotary sensor system 10 is shown by way of example, which includes a sensing or scanning head 12 and a gear wheel 16 with a non-illustrated involute toothing, which is arranged on a shaft 14 and serves as a scale. The measurement principle used here is based on a contactless scanning of the splined, ferromagnetic scales by means of magnetic field-sensitive sensors or scanners 18, which are incorporated in the sensing or scanning head.

The gear wheel 16 includes an incremental signal track 19 provided with a uniform involute toothing and a zero track 22 provided with a single reference tooth 20.

In two sensor windows formed as slots 24 inside the housing 26 of the scanning head 12, there is each formed a sensor 18 at the level of the incremental track 19 and also a sensor at the level of the zero track 22. The sensors 18 terminate flush with the surface of the housing.

The structure of the sensor unit can be illustrated with reference to the perspective representation of the only partly mounted sensor unit as shown in FIGS. 2 to 6. The sensor referred to above as sensing or scanning head 12 includes a two-part aluminum housing 26 with the parts 28 and 30. The part 28 laterally includes two flange-like projections 32 and 34, in which longitudinal bores 36 are disposed for accommodating mounting screws (cf. FIG. 2).

Figure 3:
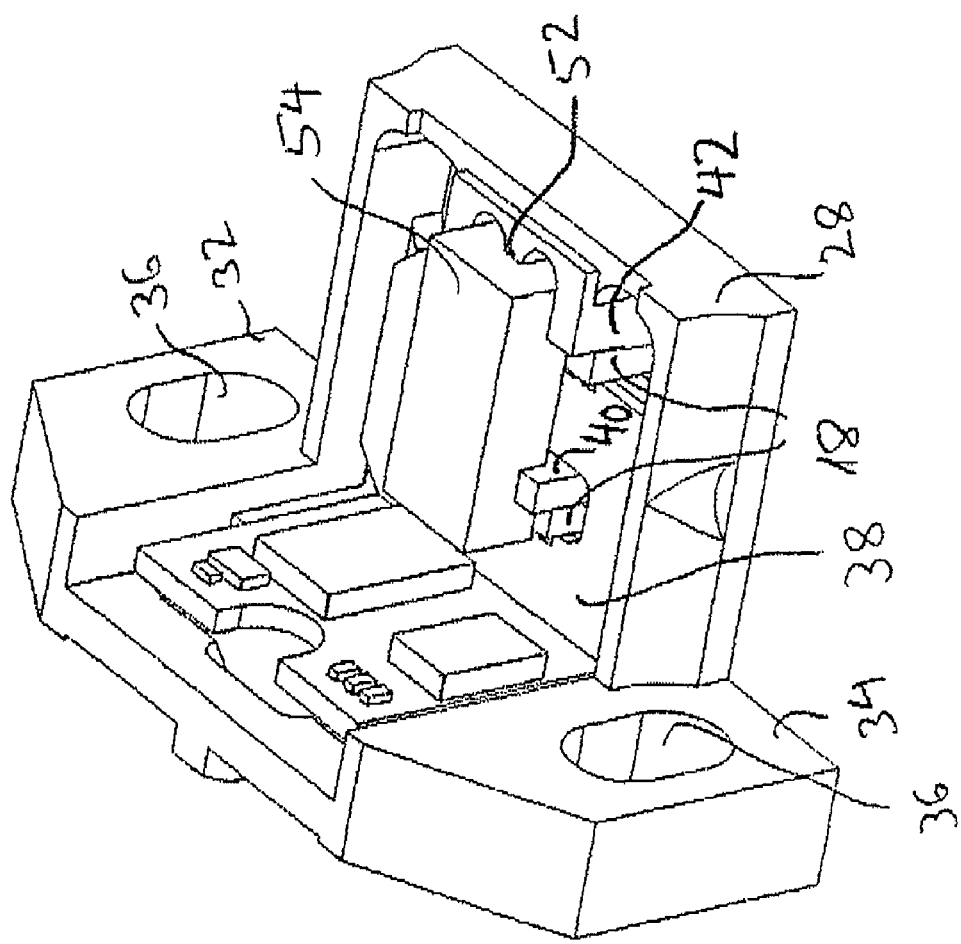

FIG. 3 merely shows the housing part 28, in which the slidable hood-like housing part 30 (cf. FIG. 2) is removed.

Inside the housing, an L-shaped circuit board 38 is arranged, on which the electronic components necessary for the processing electronics are disposed.

Figure 4:
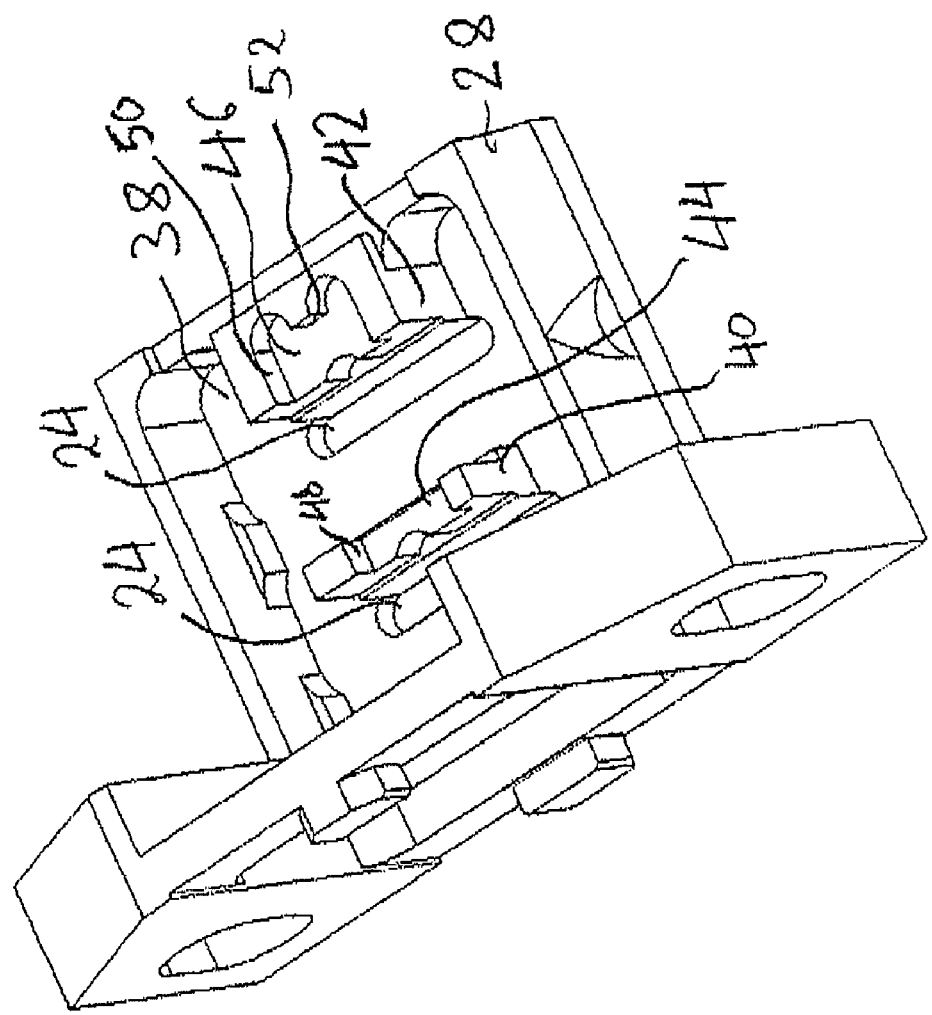

The housing part 28 and a component are shown in FIG. 4. Here, two longitudinal slots extending parallel to each other are provided in the bottom 38 of the housing part 28. Flush with one side wall each of the longitudinal slots 24, projections 40, 42 are integrally cast on the housing part 28. In their upper region, the projections 40 and 42 each include recesses 44 and 46. The recesses 44 and 46 each have lateral borders 48 and 50 and an end-face border 52, which is disposed in the recess 46.

The projections 40 and 42 terminating flush with the respective one side wall of the slots 24 facilitate the accurate positioning of sensor elements 18 in the slots 24 (cf. FIG. 3). This ensures the conformal alignment of the sensor elements in the slot 24. The slots 24 each are larger than the longitudinal extension of the sensor elements. Thus, the sensor elements can be shifted inside the slots. When adjusting the sensor elements, the sensor elements are shifted correspondingly, before they are advantageously fixed in the housing part 28 by bonding. After mounting all further parts, the sensor elements 18 are firmly potted inside the housing 28 together with the other parts by using a potting compound (not shown here).

However, the projections 40 and 42 do not serve to simplify the positioning of the sensor elements 18. At the same time, the correspondingly recessed supporting surfaces 44 and 46 provide for an easy and accurate insertion of a cuboidal magnet 54. The cuboidal magnet 54 rests against the contact surfaces 48 and 50 in the recesses 44 and 46 and is positioned in its longitudinal alignment inside the housing 28 by the contact surface 52. In this position, the magnet is bonded, before it is secured in its position by correspondingly potting with a potting compound.

Figure 5:
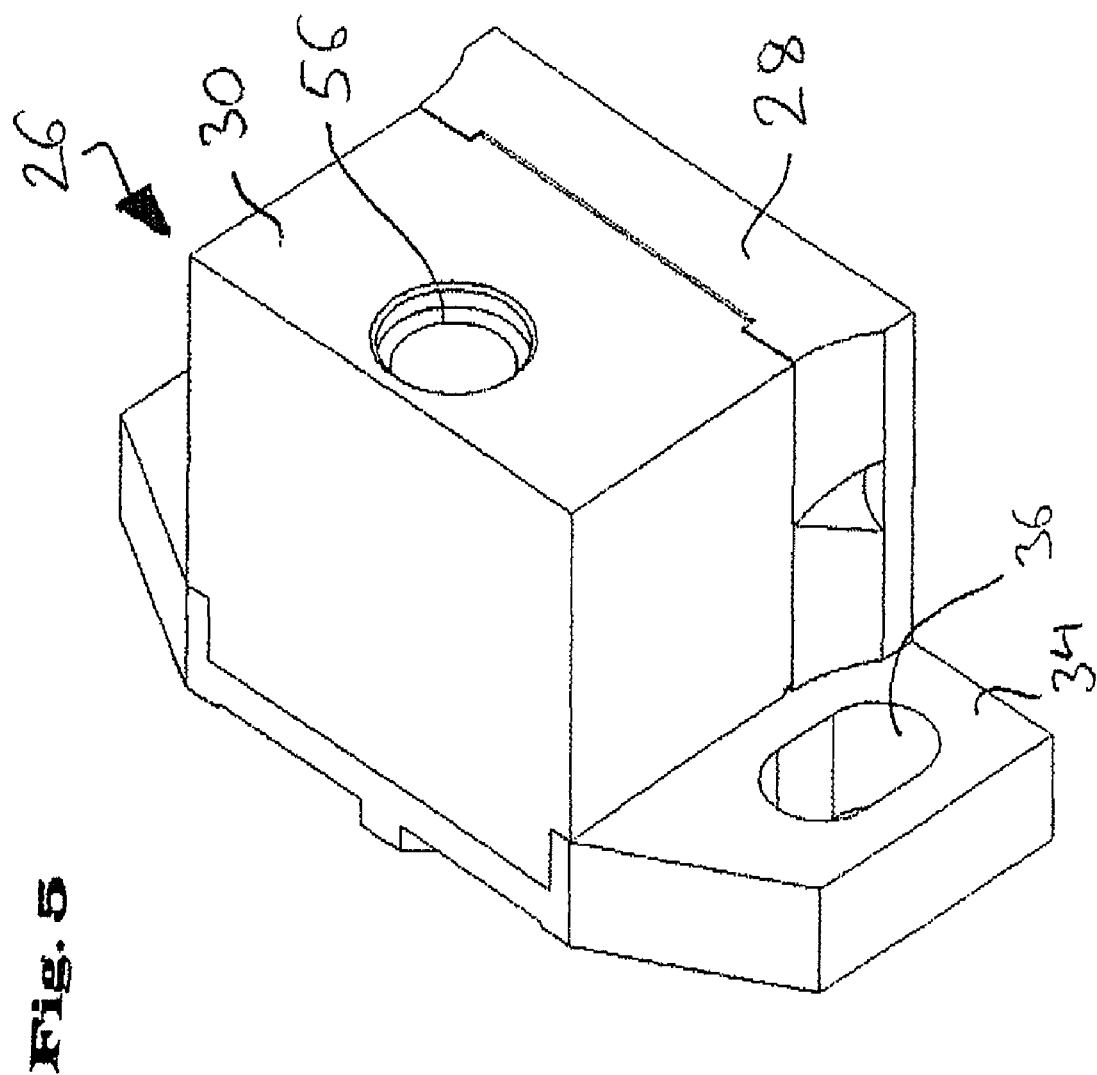
Figure 6:
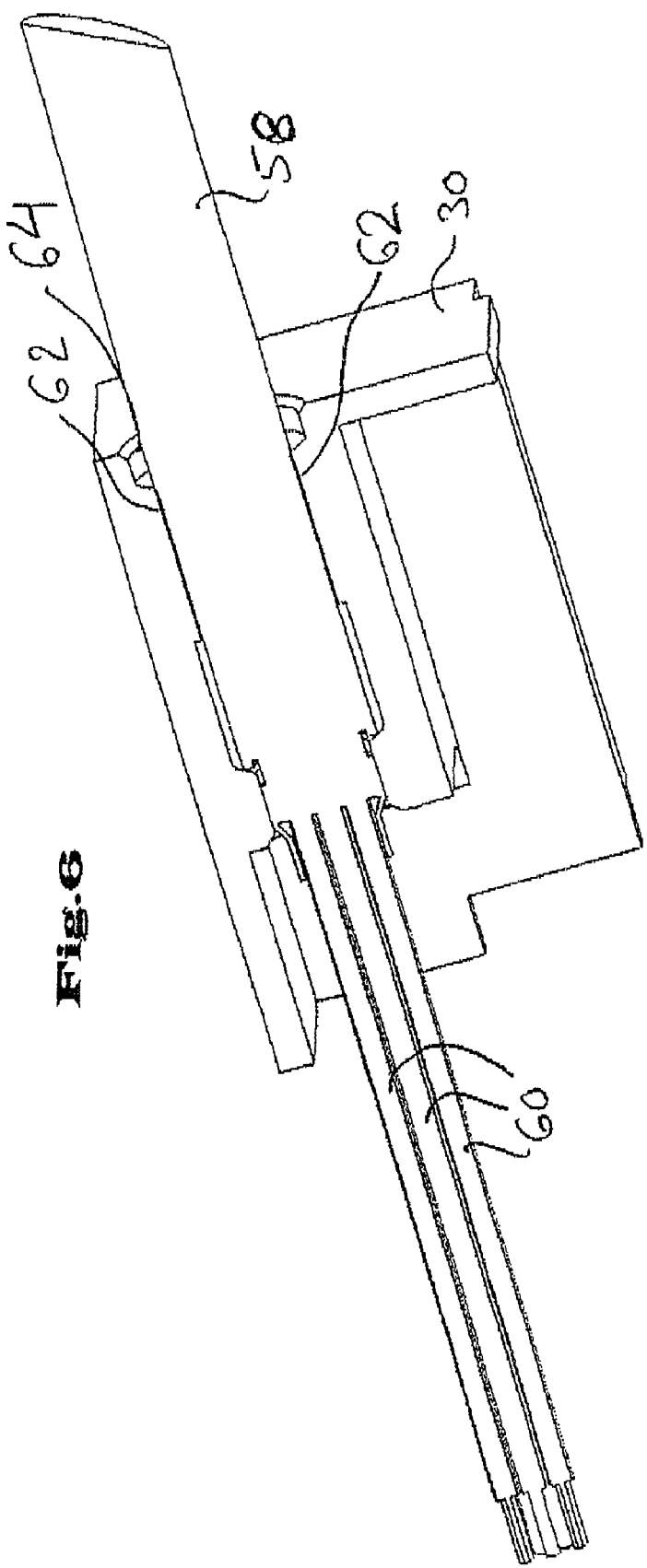

In FIG. 5, a round recess 56 is shown in the housing part 30 of the housing 26, through which a connecting cable 58 (cf. FIG. 1 and FIG. 6) is introduced into the housing 26. A corresponding section is shown in FIG. 6, in which the supply cable 56 is introduced into the above-described sensor and is divided there into the individual strands 60. For strain relief via its outside insulation, this cable 58 is screwed into a non-illustrated thread 62 in the housing. An annular groove region 64 surrounding the cable in the opening 56 is filled with potting compound for an additional fixation and sealing after correspondingly introducing the cable (not shown in the Figures).

Due to the clever arrangement of the individual components inside the sensor housing 28, a compensation circuit can additionally be integrated in the sensor 12 as an integrated component, which optimizes the amplitude configuration of the useful signal, which is adversely influenced for instance by ageing, temperature and distance from the measurement object. In accordance with the invention, the compensation circuit can of course also be provided outside the housing.

The invention claimed is:

1. A sensor comprising:
   at least one magnetic field-sensitive GMR sensor element arranged in a housing, the housing additionally including at least one magnetic field source each associated to the at least one GMR sensor element, the at least one GMR sensor element firmly cast into an associated slot in the housing, wherein on at least one side of the slot a projection protrudes into an interior of the housing, flush with a side wall of the slot, the projection including mounting recesses for accommodating the magnetic field source; and
   an L-shaped circuit board arranged inside the housing and including processing electronics.

2. The sensor according to claim 1, wherein the at least one GMR sensor element is associated to a reference signal track in a scale for generating a reference signal, the scale arranged at a given distance from the sensor.

3. The sensor according to claim 2, wherein the GMR sensor element contains two basic sensor elements, which are each associated to respective incremental reference signal tracks such that they generate two phase-shifted signals.

4. The sensor according to claim 3, wherein the magnetic field source comprises at least one permanent magnet.

5. The sensor according to claim 4, wherein the permanent magnet is cuboidal, wherein its dimensions relative to the associated GMR sensor element are such that a largely homogeneous magnetic field acts on the GMR sensor element.

6. The sensor according to claim 1, wherein the housing is made of aluminum.

7. The sensor according to claim 1, wherein the at least one GMR sensor element includes an encapsulated GMR sensor element.

8. The sensor according to claim 1, wherein the at least one GMR sensor element includes a non-encapsulated GMR sensor element.

9. The sensor according to claim 1, wherein the slot is longer than a length of the magnetic field-sensitive GMR sensor element.

10. The sensor according to claim 1, wherein the housing has a substantially two-part design.

11. The sensor according to claim 1, wherein two GMR sensors and a magnetic field source associated to each sensor are inserted in the housing in a fixed association relative to each other.

12. The sensor according to claim 1 further comprising a supply cable, wherein the supply cable of the sensor is screwed into a thread of the housing for strain relief via its outside insulation.

13. A system comprising:
a magnetic sensor comprising at least one magnetic field-sensitive GMR sensor element arranged in a housing, the housing additionally including at least one magnetic field source each associated to the at least one GMR sensor element, the at least one GMR sensor element firmly cast into an associated slot in the housing, wherein on at least one side of the slot, a projection protrudes into an interior of the housing, flush with a side wall of the slot, the projection including mounting recesses for accommodating the magnetic field source;
an L-shaped circuit board arranged inside the housing and including processing electronics; and
a scale arranged at a given distance from the sensor, the scale including a reference track associated with the sensor element.

14. A sensor comprising:
a sensor housing including a first and second slot, each slot including at least one side defined by a side wall on an elongate side of the slot, the side wall having a surface, the elongate sides of the slots each including a projection that protrudes into an interior of the housing, the projections flush with the respective surfaces of the side walls of the slots;
first and second magnetic field-sensitive GMR sensor elements firmly cast into the respective slots in the housing;
first and second magnetic field sources associated to the respective first and second sensor elements, the sources each arranged in the housing, wherein each of the projections includes a mounting recess shaped to accommodate the respective magnetic field sources and to position the respective magnetic field sources relative to the respective sensor elements and the housing; and
an L-shaped circuit board arranged inside the housing and including processing electronics.

15. The sensor according to claim 14 wherein the at least one GMR sensor element is associated to a reference signal track in a scale for generating a reference signal.

16. The sensor according to claim 15 wherein the GMR sensor element contains two basic sensor elements, which are each associated to respective incremental reference signal tracks such that they generate two phase-shifted signals.

17. The sensor according to claim 16 wherein the magnetic field source comprises at least one permanent magnet.

* * * * *